United States Patent Office 2,878,256
Patented Mar. 17, 1959

2,878,256
TRI-CYCLOHEXYL BORATES

Don Lester Hunter and Edgar W. Fajans, Los Angeles, Calif., assignors, by mesne assignments, to United States Borax & Chemical Corporation No Drawing. Application June 24, 1955
Serial No. 517,672

5 Claims. (Cl. 260—462)

This invention relates to a class of boric acid esters that are relatively stable to hydrolysis.

The compounds of the invention are tri-cyclohexyl derivatives of boric acid, in which each of the cyclohexyl groups is sustituted at the 2-position by either aryl, cyclohexyl or a substituted analogue thereof. The cyclic nuclei adjacent the ester linkages may be further substituted by such groups as halogen, alkyl, aryl, alkoxy and the like. The described substitutions may be different for the three cyclohexyl groups associated with each boron atom.

The compounds of the invention are all characterized by the saturated nature of the three cyclohexyl groups that are directly adjacent the ester linkages, and by the presence of saturated or unsaturated carbon rings at the 2-positions of those cyclohexyl groups.

The compounds of the invention are remarkably stable in the presence of water. That stability to hydrolysis is believed to be associated with the saturated nature of the three cyclohexyl groups that are directly adjacent the ester linkages, in combination with the presence of saturated or unsaturated carbon rings at the 2-positions of those cyclohexyl groups. In contrast to the relative stability provided by the compounds of the present invention, such compounds as tri-(2-cyclohexylphenyl) borate, in which the ester linkages are associated with unsaturated carbon rings have been described in U. S. Patent 2,260,339 as hydrolyzing readily on contact with water.

The substantial stability to hydrolysis of the present compounds renders them particularly useful in industry and in the laboratory for many processes that require an effectively stable organic borate. For example, the present compounds are useful for introducing boron in stable form into organic solutions, as may be required, for example, for providing standard concentrations of boron for standardizing spectral analyses of petroleum products that may contain appreciable amounts of water. The present compounds are also useful for such purposes as fusel oil purification, inhibition of fruit and vegetable decay, welding and brazing operations, use as intermediates in organic syntheses, and for incorporation in cosmetic and medicinal preparations, in paint compositions, in synthetic resins and in fuels for internal combustion engines.

Tri-cyclohexyl borates in accordance with the present invention include tri-(2-cyclohexylcyclohexyl) borate, tri-(2-phenylcyclohexyl) borate, tri-(2-naphthylcyclohexyl) borate and analogues thereof in which either or both of the cyclic nuclei may be substituted by such groups as halogen, alkyl, aryl, alkoxy and the like. From zero to four such substituents may be associated with the respective cyclic nuclei adjacent the ester linkages, while the outer cyclic nuclei may accommodate five or more substitutents. Representative examples of such substituted cyclohexyl borates are:

Tri-[2-(2,4-dichlorophenyl)-cyclohexyl] borate,
Tri-[2-(2-ethoxyphenyl)-cyclohexyl] borate,
Tri-[2-(4-tertiary butylphenyl)-cyclohexyl] borate,
Tri-[2-(2-chlorocyclohexyl)-cyclohexyl] borate,
Tri-[2-(2,4,6-trichlorocyclohexyl)-cyclohexyl] borate,
Tri-[2-(beta-naphthyl)-cyclohexyl] borate,
Tri-[2-(2,4-dichlorocyclohexyl)-4-chlorocyclohexyl] borate,
Tri-[2-(2,3,4,5,6-pentachlorophenyl)-cyclohexyl] borate, and
Tri-(2-cyclohexyl-4-phenylcyclohexyl) borate.

The compounds of the present invention may be prepared by the direct reaction of the corresponding alcohols with a suitable source of boron, such, for example, as boric acid, borax and sulfuric acid, boron trioxide, boron acetate, or a boric acid ester, such as trimethyl borate, capable of giving an interchange of alcohol groups. When the boron source is such as to produce water in the reaction, removal of such water may be aided by carrying out the reaction in an inert solvent, such as xylene, benzene or toluene, for example, which will form a binary azeotrope with the water. If mixtures of different alcohols are reacted with boron trioxide, for example, corresponding mixed esters may be obtained.

The alcohols from which the compounds of the invention may thus be prepared, such as 2-cyclohexylcyclohexanol, 2-phenylcyclohexanol and substituted analogues thereof, may each exist in at least two geometrically distinct isomeric forms, each of which comprises a racemic modification. If pure cis-2-cyclohexylcyclohexanol, for example, is used in the synthesis, two racemic modifications of tri-(cis-2-cyclohexylcyclohexyl) borate will result. If pure trans alcohol is used, two different racemic modifications will result. If a mixture of cis and trans alcohols is used, the four above racemates plus an additional six mixed racemates may result, or a mixture of ten different compounds each of which may have a different melting point. The rates of hydrolysis of such isomeric forms of a single compound may differ appreciably, but are typically of the same order of magnitude.

By reacting mixtures of different alcohols of the type described with a suitable source of boron, corresponding mixed esters may be obtained, the relative concentrations of the mixed esters depending upon the proportions of the different alcohols employed in the synthesis. Those mixed esters, of which 2-cyclohexylcyclohexyl-di-(2-phenylcyclohexyl) borate is an example, have the primary structural characteristics and exhibit the properties already described.

The following specific examples are illustrative of the compounds of the invention and of procedures by which they may be prepared.

*Example 1.*—Tri-(cis-2-cyclohexylcyclohexyl) borate. The apparatus comprised a five liter round-bottomed flask equipped with a reflux column 1.5 inches in diameter and 24 inches long packed with glass helices. The reaction vessel was charged with a mixture of 110 grams (1.75 moles) of boric acid, 1000 grams (5.52 moles) of cis-2-cyclohexylcyclohexanol and 2 liters of xylene. The reaction mixture was heated at reflux so as to maintain a steady distillation of the water that resulted from reaction of the boric acid and alcohol as a waer-xylene azeotrope. The rate of distillation was such that 95 grams of water, the theoretical amount of water produced by the reaction, were removed in four hours. Approximately one liter of xylene was then removed by distillation. The residual mixture was cooled and, before crystallization, was poured into 2 liters of acetone. The ester crystallized immediately as a white powdery solid, which was removed by filtration in a Buchner funnel and washed with fresh acetone. The crude ester was purified by solution in hot benzene (1 gram in 6 ml.) and reprecipitation in three times the volume of acetone.

Final washing and drying gave 806 grams of white crystalline ester, corresponding to 83% of the theoretical yield. A small sample was recrystallized (benzene-acetone) for analysis.

That final sample was found to melt at 198 to 199° C. Analysis of the product yielded a composition of C, 78.04%; H, 11.50%; B, 1.96%; in good agreement with the calculated value of $C_{36}H_{63}O_3B$, namely, C, 77.95; H, 11.45; B, 1.95. The neutralization equivalent was found experimentally to be 184, in agreement with the theoretical value of 185.

*Example 2.*—Tri-(2-cyclohexylcyclohexyl) borate was prepared by carrying out substantially the procedure of Example 3 (see below) with 2-cyclohexylcyclohexanol comprising cis and trans forms in a ratio of approximately 7:3. The resulting ester, comprising a mixture of isomeric modifications, melts at 172 to 198° C.

*Example 3.*—Tri-(2-phenylcyclohexyl) borate. A 500-ml. round-bottomed flask equipped with a water trap, condenser and calcium chloride tube was charged with a mixture of 125 grams (0.71 mole) of 2-phenylcyclohexanol, 13 grams (0.21 mole) of boric acid and 75 ml. of toluene. The alcohol comprised a mixture of cis and trans forms. The mixture was brought to reflux temperature and the theoretical amount of water produced by the reaction (11.4 ml.) was separated in 80 minutes. After distillation of the toluene, the residual solid was recrystallized three times from acetone to give 67 grams (60% yield) of white crystalline material melting at 96 to 106.6° C. Analysis gave a boron content of 2.04%, in good agreement with the theoretical value of 2.02% for $C_{36}H_{45}O_3B$.

*Example 4.*—Tri-(cis-2-phenylcyclohexyl) borate. Substantially the procedure of Example 3 was carried out using a 100-ml. round-bottomed flask charged with 17.47 grams (0.099 mole) of cis-2-phenylcyclohexanol, 1.98 grams (0.032 mole) of boric acid and 50 ml. of toluene. Eighty-eight percent (1.52 ml.) of the theoretical water of reaction was removed in six hours. The product after one recrystallization from acetone was 15.8 grams (92% yield) of white crystalline material melting at 123.2 to 135.6° C. Analysis gave 2.03% boron. Further recrystallization of the material from acetone produced two types of crystals, hard granules melting at 138 to 143° and needles melting at 144 to 151° C.

*Example 5.*—Tri-(trans-2-phenylcyclohexyl) borate. Substantially the procedure of Example 4 was repeated with trans-2-phenylcyclohexanol to give 1.40 ml. (81% of the theoretical yield) of water in six hours and subsequently 12.0 grams (70% yield) of white granules melting at 107.6 to 116° C. Analysis gave 2.06% boron.

The other compounds described above as coming within the present invention may be prepared in accordance with the preceding examples, the alcohol or alcohols corresponding to the desired product being substituted in each instance for that mentioned in the example.

The remarkable stability of the compounds of the present invention is illustratively shown by the following quantitative data, obtained under two representative test conditions. One gram samples of tri-(2-cyclohexylcyclohexyl) borate and of tri-(2-phenylcyclohexyl) borate of mixed isomeric forms, prepared in substantial accordance with the procedure of Example 3, were placed in 100 ml. of distilled water for twenty-four hours at room temperature. Mannitol and phenolphthalein were then added and the boric acid titrated with 0.2457 N sodium hydroxide. Only 2.85% of the cyclohexylcyclohexyl borate and 3.95% of the phenylcyclohexyl borate were hydrolyzed after the described treatment.

Weighed samples (0.80 gram) to be tested were placed with 200 ml. of distilled water and 2.93 ml. of 0.2457 N sodium hydroxide solution in glass stoppered bottles and subjected to constant agitation in a rotary tumbler in a constant temperature bath at 21° C. for forty-eight hours. Mannitol and phenolphthalein were then added and the excess base back-titrated with 0.2400 N hydrochloric acid. Tri-(2-cyclohexylcyclohexyl) borate prepared in accordance with Example 3 and comprising a mixture of cis and trans forms was found to be hydrolyzed to the extent of only 4.08% after the described treatment; and two lots of tri-(cis-2-cyclohexylcyclohexyl) borate prepared from alcohol from two different sources in accordance with Examples 1 and 3, respectively, were both hydrolyzed to the extent of only 2.90%.

This application is a continuation-in-part of our co-pending patent application Serial No. 441,918, filed July 7, 1954, under the same title, now abandoned.

We claim:

1. A tri-cyclohexyl borate in which each of the cyclohexyl nuclei is substituted at the 2-position by a member of the group consisting of phenyl, naphthyl, cyclohexyl and halogen substituted derivatives thereof and is further substituted by a number between zero and one inclusive of radicals each of which is selected from the group consisting of halogen and phenyl.

2. A tri-cyclohexyl borate in which each of the cyclohexyl nuclei is substituted at the 2-position by a member of the group consisting of phenyl, naphthyl, cyclohexyl and halogen substituted derivatives thereof and is further substituted by a number between zero and one inclusive of halogen radicals.

3. A tri-cyclohexyl borate in which each of the cyclohexyl nuclei is substituted at the 2-position by a member of the group consisting of phenyl, naphthyl, cyclohexyl and halogen substituted derivatives thereof.

4. Tri-(2-cyclohexylcyclohexyl) borate.

5. Tri-(2-phenylcyclohexyl) borate.

References Cited in the file of this patent

UNITED STATES PATENTS 2,413,718    Lincoln et al. _____ Jan. 7, 1947